2,940,874

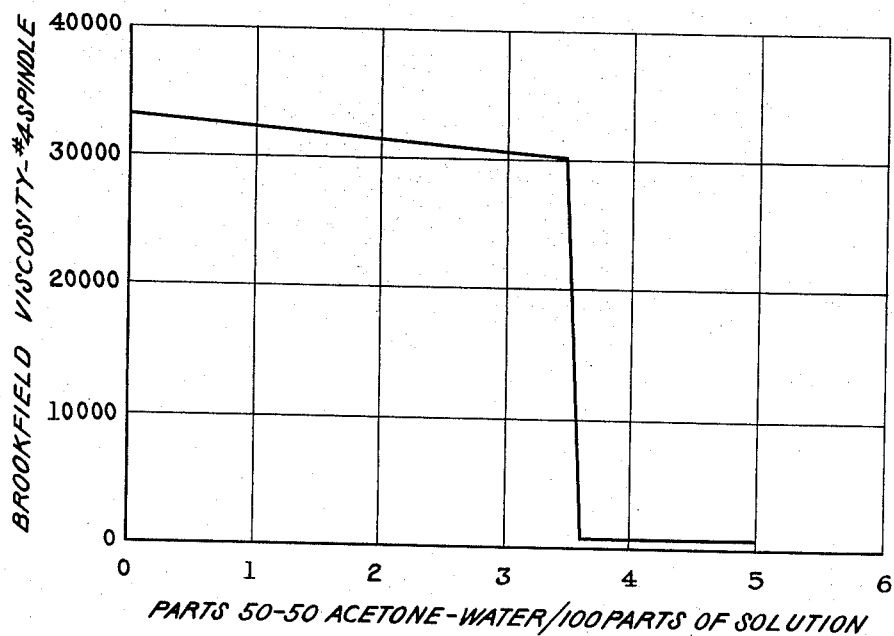

METHOD OF SPRAYING BY REDUCING THE VISCOSITY OF A COPOLYMER SOLUTION

Gerald L. Barnes, South Bend, Ind., assignor to United States Rubber Company, New York, N.Y., a corporation of New Jersey Filed June 19, 1958, Ser. No. 743,088

6 Claims. (Cl. 117—104)

This invention relates to a method of reducing the viscosity of solvent solutions of certain thermoplastic copolymers of trifluorochloroethylene and vinylidene fluoride and more particularly to a method of making fuel cells intended for use with strong oxidizing fuels, such as 90% hydrogen peroxide or fuming nitric acid, from the resulting solutions.

A specific thermoplastic copolymer of the above type which is particularly adapted to use in my invention is the copolymer of approximately 72 to 76 mol percent of trifluorochloroethylene and correspondingly 28 to 24 mol percent of vinylidene fluoride, this copolymer being soluble to the extent of at least 15 percent by weight and preferably 25 percent by weight in methyl isobutyl ketone or equivalent organic solvent. An example of such a copolymer is that sold commercially under the trademark "Kel–F820" by the Jersey City Chemical Division of Minnesota Mining and Manufacturing Company. "Kel–F 820" is made by the procedure described in Honn U.S. Patent No. 2,770,605, and contains approximately 73 mol percent of trifluorochloroethylene and 27 mol percent of vinylidene fluoride. A 20% (by weight) solids solution of "Kel–F 820" in methyl isobutyl ketone has a Brookfield viscosity (#4 spindle) of about 38,000. With respect to physical properties, the copolymer has a specific gravity of 2.01 and a molded specimen exhibits a tensile strength of 3400 pounds per square inch, an elongation at break of 230% and a yield point of 1040 pounds per square inch.

Although those skilled in the art have recognized that this copolymer has chemical and physical properties making it an ideal material for the construction of fuel cells of the type referred to above, attempts to construct fuel cells from it have been unsuccessful due to the extremely high solution viscosity of the material which necessitated the use of organic solvent solutions containing very low solids levels of the order of 3 to 6% by weight. It was necessary to use this low solids content in order to have a solvent solution thin enough to paint or spray with minimum danger of air bubble entrapment. At such low solids concentrations (3–6%) of this copolymer, it is necessary to apply a multiplicity of layers by painting or spraying to obtain the strength and impermeability required. Even at these low solids levels there is still considerable danger of trapped air which results in blistering.

The principal object of the present invention is to overcome the disadvantages of prior art practices with solutions of the above-mentioned copolymers of trifluorochloroethylene and vinylidene fluoride in volatile organic solvents. Another object is to provide a simple, economical and commercially feasible method of greatly reducing the solvent solution viscosity of these copolymers so that they may be applied by the standard methods, such as spraying or brushing, at far higher solids levels than has been heretofore possible. Another object is to provide a method of making a fuel cell from these copolymers which overcomes the objections referred to above.

The accompanying drawing is a graph showing the variation in viscosity of a solution of a copolymer of the type mentioned above in a volatile organic solvent, which solution initially contains 20% by weight of the copolymer, upon the addition thereto of a liquid containing water in accordance with the present invention.

My invention is based upon the discovery that a great reduction in the viscosity of an organic solvent solution of copolymers of the type in question may be achieved, while bringing about only a minor reduction in solids content, typically amounting to less than 1%, by simply admixing uniformly with the copolymer solution a minor proportion (generally not over 15 parts by weight per 100 parts of the solution) of diluent composed of water or a lower ($C_1$ to $C_5$) alkanol such as methyl alcohol, ethyl alcohol, n-propanol, isopropanol, n-butanol, isobutanol, sec-butanol, tert-butanol, or an amyl alcohol or mixtures of any two or more of these materials.

I much prefer to use water as the diluent because of its cheapness, because only small amounts of it are required since it has a higher "non-solvency" than any other material known to me and because its boiling point is most appropriate for use with the system of copolymer and solvent which I have found to be most practical. By "non-solvency" I mean the opposite of solvency. The term "non-solvency" which I have coined refers to the effectiveness of a given amount of diluent in reducing the solution viscosity. Thus to achieve with an alkanol the same reduction in viscosity as is brought about by say 1.75 parts of water will require substantially more of the alkanol, depending on the number of carbon atoms per molecule.

With water as the diluent I generally use from 1.5 to 2.0% by weight based on the initial solvent solution of the polymer. The exact mount of water will vary with the ratio of polymer to solvent, with the nature of the solvent (i.e. the type and relative proportion of the components), and with the purity of the components of the solvent.

The amount of the alkanols used as diluents will be substantially greater than the amount of water and will vary with the same factors as were just mentioned for water. The amount of the alkanol will also vary with the particular one used; thus the amount will increase as the number of carbon atoms increases.

The anomalous nature of my invention is illustrated by the fact that if the same amount of water as is used as a diluent were instead added to the solvent mixture prior to solution of the polymer therein, the polymer would remain insoluble in the solvent mixture. This will help to explain why, as will appear from this disclosure, I can have isopropanol present in the original system in an amount far less than that required to cause thinning (viscosity reduction) and achieve my results by adding isopropanol to such a system. The isopropanol originally present is ineffective to achieve my purposes; it is the added isopropanol that accomplishes my objective of a remarkable reduction in solution viscosity.

It is not possible, because of the many variables, to specify with exactness the amounts of alkanol diluents to be used. Such amounts are far more variable than in the case of water which is such a good "non-solvent" that the operable amount can be fixed with fair preciseness. However, the following figures for the three most common alkanols will serve as illustrative; thus, 4 to 5 parts of methanol, 7 to 8 parts of ethanol and 10 to 12 parts of isopropanol per 100 parts by weight of solution will be found to be suitable for use with the preferred solution shown in the example below.

To illustrate my invention I may state that in normal circumstances a 20% solids solvent solution of "Kel–F 820" has a viscosity of 30,000 to 40,000 as measured on the well known Brookfield Viscometer using a #4 spindle. The addition to this solution of 1.75 parts of water reduces the viscosity of the solution by approximately 1000%; this reduction is accompanied by only a very minor drop in the solids content, this drop amounting to less than 1%; thus my invention permits spraying or brushing high solids "Kel-F 820" solutions in making fuel cells.

In the preferred practice of my invention I pre-mix the diluent, preferably water, with a "primary" solvent, i.e., a volatile organic liquid which is a solvent for the "Kel-F 820" material, and commingle the resulting mixture with the solvent solution of the copolymer whose viscosity is to be reduced. My reasons for pre-mixing the diluent with such a "primary" solvent are twofold. In the first place, the extension of the diluent with the primary solvent serves in an important way to prevent localized concentration of the diluent during the step of mixing with the copolymer solution. Secondly, only a very small amount of the diluent in relation to the amount of the copolymer solution is used to achieve the unexpected results of my invention and by commingling the diluent with the primary solvent one handles a substantially larger volume of material so that it is possible to get better control of the proportion of diluent to the original copolymer solution.

The requirements for the primary solvent are (1) that it be miscible with the diluent to the extent that it will dissolve at least 10 percent by weight of the diluent and preferably 100 percent by weight of the diluent and (2) that it be an active solvent for the copolymer. When water is the diluent, acetone is the preferred primary solvent but I can also use methyl ethyl ketone. When the diluent is an alkanol, the choice of primary solvent is not nearly so limited; thus with the alkanols I can use, in addition to acetone and methyl ethyl ketone, such solvents as methyl isopropyl ketone, methyl isobutyl ketone or any of the organic solvents specified in U.S. Patent No. 2,770,605 from column 5, line 60, to column 6, line 3, which have the requisite miscibility with the alkanol diluent. It may be pointed out that although U.S. Patent No. 2,770,605 indicates that acetone is not a solvent for the copolymer I have found that it does exhibit such a degree of solvency therefor as to make its use in admixture with the diluent highly effective.

The relative proportions of the diluent and the primary solvent may vary widely, but I generally prefer to use approximately equal proportions of each. Generally the proportion of diluent is equal to at least 10% by weight of the mixture and the proportion of diluent can range upwardly from this figure to as high as 100%; the latter figure of course corresponds to the use of no primary solvent in the additive material. Generally the amount of the primary solvent does not exceed 15 parts per 100 parts by weight of the initial copolymer solution. Thus I usually add not over 15 parts of diluent and not over 15 parts of primary solvent/100 parts of solution.

The solids level of the original copolymer solution whose viscosity is reduced by my invention can vary widely but I prefer to use solutions having a relatively high solids content, i.e., solutions containing from 15 to 25% by weight of the copolymer. For convenience the copolymer content may originally be in the neighborhood of 20% by weight. At a 20% solids level the solution is extremely viscous, normally having a viscosity of approximately 35,000 as measured on the Brookfield Viscometer using a #4 spindle. It is not practical to effect a higher solids content than 25% since the viscosity becomes so high if this level is attempted as to make the mixture extremely difficult to mix. I could use in the practice of my invention copolymer solutions having a solids content lower than 15%, say as low as 3%, but I prefer a level of at least 15% because of the smaller volume of material to be handled and the more rapid build-up of the fuel cell wall.

In the preferred practice of my invention I commingle with the copolymer solution containing 15 to 25% of copolymer a solution of approximately equal proportions of water and acetone in an amount equal to from 3.0 to 4.0% by weight of the original copolymer solution. The amount of water thus introduced is equal to from 1.5 to 2.0% of the copolymer solution.

In making a fuel cell in accordance with my invention I utilize the standard methods known to the art. Thus I employ the conventional form of cardboard or other disposable material. I prepare the mixture of reduced viscosity as described herein and then I apply this mixture to the temporary form, generally by spraying (standard spray gun techniques without modification are used), so as to build up an inner liner or layer of from 10 to 15 thousandths of an inch in thickness. I then apply a reinforcing fabric layer over the deposit thus built up. I then resume the application of the copolymer mixture of reduced viscosity until a total thickness of about 25 thousandths of an inch has been reached. No curative is used in the solution and curing of the cell is not required. Likewise prolonged or special heating at high temperature to effect fusion of the coating is eliminated. However, the resulting composite assembly is dried at a moderately elevated temperature, for example at from 150° F. to 300° F., in order to remove all traces of solvent. To prevent blistering it is necessary to carry out primary drying at a temperature in the lower portion of this range, say at about 165° F. after which secondary or final drying at a higher temperature is carried out. After drying, the form is destroyed and removed. The result is a strong impermeable fuel cell characterized by the facts that the resin deposits built up on the two sides of the fabric are integrally merged and that no air is entrapped in the structure.

Example

| | Parts by weight |
|---|---|
| "Kel-F 820" | 75 |
| Methyl isobutyl ketone | 180 |
| Toluene | 70 |
| Isopropanol | 50 |

The "Kel-F 820" is blended into the combined solution of the three organic liquids so as to give a 20% solvent solution. This solution has a viscosity of approximately 35,000.

Under agitation, which can be effected with an air mixer, approximately 3.5 parts (by weight) of a 50-50 (by weight) mixture of acetone and water are added for each 100 parts of the 20% solids solution. This reduces the viscosity to 300. Fuel cells are made from the resulting mixture in the manner described above.

The action of the addition of the acetone-water mixture is perhaps best explained by reference to the drawing in which the Brookfield Viscosity (#4 spindle) of the copolymer solution is plotted against the amount of the primary solvent-diluent (50-50 acetone-water) mixture in parts by weight per 100 parts of initial copolymer solution. It will be noted that the viscosity shows a moderate decrease (characteristic of the decrease obtained when a solution of solids is diluted with more solvent or conventional diluent) until approximately 3.5 parts of the mixture are added. At that point there is a very sharp drop in the viscosity of approximately 1000%. It should however be noted that this resulting low viscosity remains relatively constant upon the addition of further small amounts (e.g. up to one part) of the mixture. If more diluent than this is added the copolymer will agglomerate and settle out of solution. In the practice of my invention, the amount of the diluent introduced into the solution should be sufficient to accomplish the desired viscosity reduction but substantially less than that amount which would cause this undesirable agglomeration.

The success of my invention lies in the admixture of the diluent with the copolymer solution. I prefer to add the diluent, whether used alone or in admixture with a primary solvent, to the copolymer solution; the reason for this preference is that the volume of the diluent is so small relative to the volume of the copolymer solution that the addition of the latter to the former would give inferior results because of the very high proportion of diluent to copolymer solution during the initial portion of the mixing operation; this high concentration of diluent will cause agglomeration of copolymer.

As already indicated, in place of the primary solvent-diluent solution, I can use a diluent alone, such as water or the aforementioned alkanols. The addition of a diluent alone is quite critical, however, and is not as easily controlled as the addition of the primary solvent-diluent solution. Apparently the primary solvent acts as a carrier and permits the addition of the diluent more slowly to the copolymer solution; as previously indicated, the primary solvent also prevents a high local concentration of diluent from developing at the point of addition; such high local concentration would be objectionable because it would cause precipitation or agglomeration of the copolymer.

In the practice of my invention using the specific formulation given in the above example, I prefer to add approximately 1.5 to 1.75 parts by weight of water as diluent per 100 parts of 20% solids solution. If, in the above example, I had used an alkanol as the diluent, it would have been necessary to add more diluent since the water seems to be a stronger "non-solvent" than the alkanol.

An important aspect of my invention is that the mixture of reduced viscosity prepared in accordance with my invention can be readily sprayed by standard spraying techniques despite its very low viscosity. It is true that under normal circumstances it would be very difficult, if not impossible, to spray thick coatings of any material having a very low viscosity without encountering very bad running, especially in thick coatings. However, I have found that while my mixture has a low viscosity as it exits from the spray nozzle, it thickens considerably while passing through the air, and by the time it strikes the surface to be coated it has a viscosity again approaching the original figure of 30,000 to 40,000, typically 35,000. I believe that this can be best explained by stating that during the passage of the solution from the spray gun nozzle to the surface being coated the water or other diluent so carefully added to effect the viscosity drop is evaporated so that the system reverts to its original "viscous" state. The "viscous" material deposited on the surface still possesses good flow-out properties so that a smooth coat of a completely integral and impermeable nature is obtained. This feature makes it possible to spray relatively thick layers of the copolymer in a single application. This is a vital feature of my invention and is of tremendous importance in making my invention eminently practical from a commercial viewpoint. This very important advantage of my invention is achieved when using ordinary spray gun techniques known to the art of lacquer spraying and no special modification or special skill is required.

I believe that the original copolymer solution is a true solution but that after the addition of the diluent it is no longer a true solution but rather is a colloidal suspension; I know that it is not a true solution after the diluent is added because it is upon prolonged standing some settling occurs; however the material which settles out is readily redispersed by simple agitation. The diluted material is sprayed as a colloidal suspension but during spraying or immediately after application to the surface the diluent evaporates causing reversion to a true solution. Thus there is no need to heat the resulting deposit at high temperature to effect fusion into an integral structure, the thermoplastic being solvent-welded in the deposit. The elimination of the high temperature fusion step, which has been heretofore thought essential with thermoplastic fluorine-containing polymers of this type, is particularly advantageous because it makes it possible to use a cardboard form which would be injured by high temperature.

Having thus described my invention, what I claim and desire to protect by Letters Patent is:

1. The method which comprises effecting a material reduction in the viscosity of a solution of a copolymer of approximately 72 to 76 mole percent trifluorochloroethylene and correspondingly 28 to 24 mole per cent vinylidene fluoride in a volatile organic solvent while effecting much less than a corresponding reduction in solids content, said solution containing from 15 to 25% by weight of said copolymer, by uniformly admixing the solution with a minor proportion of a liquid selected from the group consisting of water and alkanols having from one to five carbon atoms per molecule and mixtures of the foregoing to produce the low viscosity mixture, and subsequently spraying said low viscosity mixture on to a surface to coat the same, the low viscosity mixture regaining its high viscosity before contacting said surface.

2. The method which comprises effecting a material reduction in the viscosity of a solution of a copolymer of approximately 72 to 76 mole percent trifluorochloroethylene and correspondingly 28 to 24 mole percent vinylidene fluoride in a volatile organic solvent while effecting much less than a corresponding reduction in solids content, said solution containing from 15 to 25% by weight of said copolymer, by uniformly admixing the solution with water in an amount equal to from 1.5 to 2.0% by weight of said solution to produce the low viscosity mixture, and subsequently spraying said low viscosity mixture onto a surface to coat the same, the low viscosity mixture regaining its high viscosity before contacting said surface.

3. The method which comprises effecting a material reduction in viscosity of a solution of a copolymer of approximately 72 to 76 mole percent trifluorochloroethylene and correspondingly 28 to 24 mole percent vinylidene fluoride in a volatile organic solvent consisting essentially of methyl isobutyl ketone, toluene and isopropanol while effecting much less than a corresponding reduction in solids content, said solution containing from 15 to 25% by weight of said copolymer, by uniformly admixing the solution with a minor proportion of a solution of (1) a primary solvent for said copolymer and (2) a liquid selected from the group consisting of water and alkanols having from one to five carbon atoms per molecule and mixtures of the foregoing to produce the low viscosity mixture, and subsequently spraying said low viscosity mixture on to a surface to coat the same, the low viscosity mixture regaining its high viscosity before contacting said surface.

4. A method which comprises effecting material reduction in the viscosity of a solution of a copolymer of approximately 72 to 76 mole percent trifluorochloroethylene and correspondingly 28 to 24 mole percent vinylidene fluoride in a volatile organic solvent consisting essentially of methyl isobutyl ketone, toluene and isopropanol while effecting much less than a corresponding reduction in solids content, said solution containing from 15 to 25% by weight of said copolymer, by uniformly admixing the solution with a solution of approximately equal proportions by weight of (1) acetone and (2) water, the amount of said last-named solution being equal to from 3.0 to 4.0% by weight of said first-named solution to produce the low viscosity mixture, and subsequently spraying said low viscosity mixture on to a surface to coat the same, the low viscosity mixture regaining its high viscosity before contacting said surface.

5. The method of making a fuel cell which comprises uniformly admixing a solution of a copolymer of approximately 72 to 76 mole percent trifluorochloroethylene and correspondingly 28 to 24 mole percent vinylidene fluoride in a volatile organic solvent, said solution containing 15 to 25% by weight of said copolymer, with water in an amount equal to from 1.5 to 2.0% by weight of said solution, thereby producing a sprayable mixture having a viscosity considerably lower than said first-named solution but only a slightly lower solids content than said first-named solution, spraying the resulting mixture from a nozzle onto a surface while allowing evaporation of the diluent and correspondingly allowing considerable thickening of the sprayed copolymer as it passes from the nozzle to the surface, and thereby building up a layer of solids in a form and of a thickness such as to constitute a fuel cell.

6. A method of making a fuel cell which comprises uniformly admixing a solution of a copolymer of approximately 72 to 76 mole percent trifluorochloroethylene and correspondingly 28 to 24 mole percent vinylidene fluoride in volatile organic solvent consisting essentially of methyl isobutyl ketone, toluene and isopropanol, said solution containing from 15 to 25% by weight of said copolymer, with a solution of approximately equal proportions by weight of (1) acetone and (2) water, the amount of said last-named solution being equal to from 3.0 to 4.0% by weight of said first-named solution, thereby producing a sprayable mixture having a viscosity considerably lower than said first-named solution but only a slightly lower solids content than said first-named solution, spraying the resulting mixture from a nozzle onto a surface while allowing evaporation of the diluent and correspondingly allowing considerable thickening of the sprayed copolymer as it passes from the nozzle to the surface, and thereby building up a layer of solids in a form and of a thickness such as to constitute a fuel cell.

References Cited in the file of this patent

UNITED STATES PATENTS

| | | |
|---|---|---|
| 2,559,752 | Berry | July 10, 1951 |
| 2,686,738 | Teeters | Aug. 17, 1954 |
| 2,686,767 | Green | Aug. 17, 1954 |
| 2,766,215 | Stoops et al. | Oct. 9, 1956 |
| 2,770,605 | Honn | Nov. 13, 1956 |
| 2,770,606 | Teeters et al. | Nov. 13, 1956 |
| 2,775,569 | Dipner et al. | Dec. 25, 1956 |